United States Patent Office 3,423,394
Patented Jan. 21, 1969

3,423,394
BENZOTHIAZOLYL MONAZO DYES
Max A. Weaver and David J. Wallace, Kingsport, Tenn., assignors to Eastman Kodak Company, Rochester, N.Y., a corporation of New Jersey
No Drawing. Filed Oct. 14, 1965, Ser. No. 496,130
U.S. Cl. 260—158              11 Claims
Int. Cl. C09b 27/00, 49/06

ABSTRACT OF THE DISCLOSURE

Benzothiazolyl-azo-aniline compounds, having attached to the aniline nitrogen atom a group having the formula

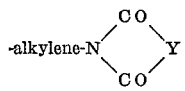

wherein Y is —NHNH— or a chain of 2 or 3 atoms containing one or two carbon atoms and an oxygen, sulfur, or nitrogen atom, are useful as dyes for hydrophobic textile materials.

---

This invention relates to azo compounds particularly useful as dyes for textile fibers, yarns and fabrics.
The azo compounds have the following general formula

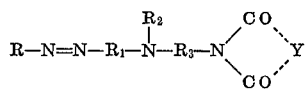

wherein R represents a 2-benzothiazolyl radical unsubstituted or substituted, i.e.,

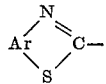

in which Ar is an ortho-arylene radical of the benzene series, including ortho-phenylene and ortho-phenylene substituted by radicals such as alkylsulfonyl, e.g., lower alkylsulfonyl, nitro, aliphatic acylamido, e.g., acetamido, cyano, thiocyano, sulfamoyl, lower cyanoalkylsulfonyl, halogen, lower alkylsulfonamido, lower alkoxy, lower alkyl, lower hydroxyalkyl, lower alkylthio, lower trifluoroalkyl, lower cyanoalkyl, lower carbalkoxy.

$R_1$ represents a monocyclic carbocyclic aryl group of the benzene series including phenylene and substituted phenylene groups such as described in more detail below.

$R_2$ represents hydrogen, alkyl, substituted alkyl or a monocyclic carbocyclic aryl group of the benzene series such as described in more detail below.

$R_3$ represents a lower alkylene group straight or branchchained, e.g., methylene, ethylene, isopropylene and butylene.

Y represents a chain of atoms containing at least one atom other than carbon, i.e. oxygen, nitrogen or sulfur, necessary to complete a 5 or 6 atom ring, for example as present in the dicarboximido radicals: 3,5-morpholinedione, 2,5-piperazinedione, 5,6-dihydrouracil and 2,4-thiazolidinedione of the azo compounds described below.

The Straley et al. U.S. Patent 3,161,631 granted Dec. 15, 1964 claims azo compounds containing the dicarboximido radical

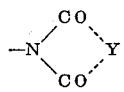

However, specific embodiments of that patent are limited to azo compounds wherein Y represents a chain containing only carbon atoms as in the succinimido radical. As described above, in the present azo compounds Y represents a chain of atoms containing at least one atom other than carbon including oxygen, nitrogen and sulfur. This distinctive structure imparts unexpected properties to the present azo compounds including improved fastness to light and sublimation especially when the azo compounds are used for dyeing textile materials.

Herein, "lower alkyl group," "lower alkylene group" and the like, means that the group contains a chain of from 1 to 4 carbon atoms, straight or branch chained.

The azo compounds of the invention are prepared by coupling well-known diazotized 2-aminobenzothiazoles with coupling components having the formula (I)   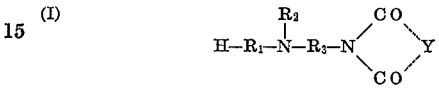

wherein R, $R_1$, $R_2$, $R_3$ and Y have the meaning given above.

The coupling components having the above Formula I are prepared by one of the two following methods:

(1)   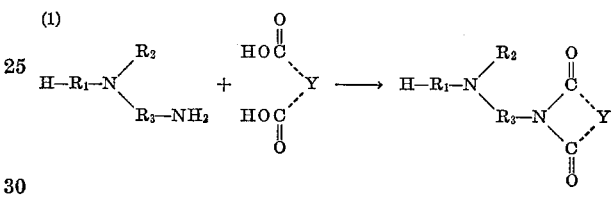

or anhydride (2)   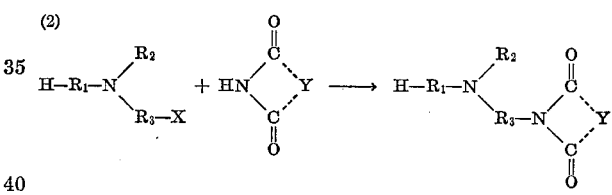

in which X is halogen.

The compounds wherein Y contains the —C—N— chain are illustrated by the uracil, dihydrouracil, hydantoin and piperazinedione substituted compounds of the examples. Where Y contains the —C—O— chain the morpholinedione substituted compounds of the examples are illustrative, and where Y contains the —C—S— chain the thiazolidinedione substituted compounds of the examples are illustrative.

The azo compounds can be used for dyeing textile materials including synthetic polymer fibers, yarns and fabrics giving a variety of fast shades including brilliant violet to scarlet shades when applied thereto by conventional dyeing methods. The azo compounds have good affinity for polyamide, cellulose ester and polyester fibers, the fastness properties being especially good on cellulose acetate and polyester fibers. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation. Thus the azo compounds can be expected to respond well to other tests for textile dyes such as described in the A.A.T.C.C. Tech Manual, 1964 edition depending upon the particular azo compound and fiber being dyed.

The various substituents attached to radicals R, $R_1$, $R_2$ and chain Y serve primarily as auxochrome groups to control the color of the azo compounds, and azo compounds particularly useful as textile dyes are obtained within a wide range of substitution. Accordingly, R in the above formula represents the 2-benzothiazolyl radical of the following illustrative compounds.

2-aminobenzothiazole,
2-amino-6-methylsulfonylbenzothiazole,
2-amino-6-ethylsulfonylbenzothiazole,
2-amino-6-n-propylsulfonylbenzothiazole,
2-amino-6-n-butylsulfonylbenzothiazole,
2-aminobenzothiazole-6-N-methylsulfonamide,
2-aminobenzothiazole-6-N-ethylsulfonamide,
2-aminobenzothiazole-6-N-n-propylsulfonamide,
2-aminobenzothiazole-6-N-n-butylsulfonamide,
2-amino-5-methoxybenzothiazole,
2-amino-6-methoxybenzothiazole,
2-amino-6-ethoxybenzothiazole,
2-amino-6-n-propoxybenzothiazole,
2-amino-6-n-butoxybenzothiazole,
2-amino-4-methylbenzothiazole,
2-amino-6-methylbenzothiazole,
2-amino-6-ethylbenzothiazole,
2-amino-6-n-propylbenzothiazole,
2-amino-6-n-butylbenzothiazole,
2-amino-6-β-hydroxyethylbenzothiazole,
2-amino-6-γ-hydroxypropylbenzothiazole,
2-amino-6-δ-hydroxybutylbenzothiazole,
2-amino-6-acetylaminobenzothiazole,
2-amino-6-n-propionylaminobenzothiazole,
2-amino-6-n-butyrylaminobenzothiazole,
2-amino-6-thiomethylbenzothiazole,
2-amino-6-thiocyanobenzothiazole,
2-amino-6-cyanobenzothiazole,
2-amino-6-trifluoromethylbenzothiazole,
2-amino-6-chlorobenzothiazole,
2-amino-4,6-dichlorobenzothiazole,
2-amino-6-nitrobenzothiazole,
2-amino-4,7-dimethoxybenzothiazole,
2-amino-5,6-dimethoxybenzothiazole,
2-amino-4,7-diethoxybenzothiazole,
2-amino-6-β-cyanoethylthiobenzothiazole,
2-amino-6-β-cyano-n-propylthiobenzothiazole,
2-amino-6-γ-cyanopropylthiobenzothiazole,
2-amino-6-β-cyanoethylsulfonylbenzothiazole,
2-amino-6-γ-cyanopropylsulfonylbenzothiazole,
2-amino-6(β,γ-dihydroxypropylthio)benzothiazole,
2-amino-6(β,γ-dihydroxypropylsulfonyl)benzothiazole,
2-amino-6-β-carboxyethylthiobenzothiazole,
2-amino-6-β-carbamylethylthiobenzothiazole,
2-amino-6-β-dimethylcarbamylisopropylthiobenzothiazole
and 2-amino-4,6-dimethylbenzothiazole.

Similarly, the following are representative of arylene group $R_1$: p-phenylene and p-phenylene substituted with lower alkyl, e.g. o,m-methyl-p-phenylene; lower alkoxy, e.g. o,m-methoxy-p-phenylene; halogen, e.g. o,m-chloro-p-phenylene; lower alkylsulfonamido-p-phenylene, e.g., o, m-methylsulfonamido-p-phenylene; lower alkanoylamino, e.g. o,m-acetamido-p-phenylene, benzamido, e.g. benzamido, e.g. benzamido1p-phenylene; or lower alkylthio, e.g. o,m-methylthio-p-phenylene.

Substituted alkyl groups represented by $R_2$ include lower alkyl, i.e., from 1 to 4 carbon atoms, being unsubstituted or substituted such as hydroxalkyl, e.g., hydroxyethyl; polyhydroxyalkyl, e.g., 2,3-dihydroxypropyl, [—CH$_2$CH(OH)CH$_2$OH]; lower alkoxyalkyl, e.g., methoxyethyl; cyanoalkyl, e.g., cyanoethyl; lower cyanoalkoxyalkyl, e.g., β-cyano-ethoxyethyl; lower alkanoyloxyalkyl, e.g., acetoxyethyl lower carboalkoxyalkyl, e.g., carbethoxyethyl; halogenoalkyl, e.g., chloroethyl; hydroxyhalogenoalkyl, e.g., β-hydroxy-γ-chloropropyl; lower alkylsulfonylalkyl, e.g., methylsulfonylethyl; lower alkyl —OCOOCH$_2$CH$_2$—, e.g., CH$_3$OCOOCH$_2$CH$_2$—; carbamylalkyl, e.g. carbamylethyl; lower alkylcarbamylalkyl, e.g. ethylcarbamylethyl; benzyl, phenoxyalkyl, e.g., β-phenoxyethyl; lower alkylsulfonamidoalkyl, e.g., methylsulfonamidoethyl: dicarboxamidoalkyl, e.g., β-dicarboxamidoethyl, etc. or $R_2$ represents a monocyclic carbocyclic aromatic group of the benzene series, e.g. phenyl and phenyl substituted with lower alkyl, lower alkoxy, or halogen.

Typical chains of atoms represented by Y are

—CH$_2$—NH—CH$_2$—, —NHCH$_2$CH$_2$—, —SCH$_2$—,
—CH$_2$SO$_2$CH$_2$—

—N(CH$_3$)CH$_2$— and —NHCH(C$_6$H$_5$)— etc. illustrated in the following examples.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-soluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The following examples will serve to illustrate the preparation of representative intermediates and azo compounds of our invention.

EXAMPLES OF COUPLERS

Preparation 3-[2-(N-ethyl-m-toluidino)ethyl]hydantoin 19.7 g. N-2-chloroethyl-N-ethyl-m-toluidine, 10.0 g. hydantoin, 13.8 g. potassium carbonate, and 150 ml. dry dimethylformamide were refluxed together for one hour. The reaction mixture was drowned into 500 ml. of water giving a white solid on standing. The product was recrystallized from ethanol to give 13.5 g. of material melting at 76–77° C., having the structure:

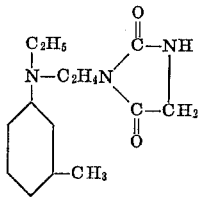

Preparation of 3-[2-(N-ethyl-m-toluidino)ethyl]-5,5-dimethylhydantoin 19.7 g. N-2-chloroethyl-N-ethyl-m-toluidine, 12.8 g. 5,5-dimethylhydantoin, 13.8 g. potassium carbonate, and 150 ml. dry dimethylformamide were refluxed together for one hour. Drowning into water, filtering, and recrystallizing from 75 ml. ethanol gave 15.2 g. white solid product with M.P. 81–82° C.

Preparation of 3-[2-(N-ethyl-m-toluidino)ethyl]-1-methyl hydantoin 19.7 g. N-2-chloroethyl-N-ethyl-m-toluidine, 11.4 g. 1-methylhydantoin, 13.8 g. potassium carbonate, and 100 ml. dry dimethylformamide were refluxed together for one hour. Drowning in water resulted in a white solid which was collected by filtration, washed with water, and recrystallized from 100 ml. ethanol to yield 18.5 g. product with M.P. 72–73° C.

Preparation of 4-[2-(N-ethyl-m-toluidino)ethyl]3,5-morpholinedione 89.0 g. N-2-aminoethyl-N-ethyl-m-toluidine, 67.0 g. diglycolic acid, and 0.1 g. sulfanilic acid were heated together at 150–155° C. for one hour. The reaction mixture was poured into 500 ml. ethanol and the product allowed to crystallize. After collection by filtration and recrystallization from 500 ml. ethanol there was obtained 70.5 g. of product of M.P. 82–83° C. This material has the following structure:

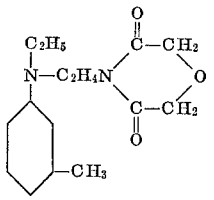

Preparation of 1-[2-(N-ethyl-m-toluidino)ethyl]-2,5-piperazinedione 44.5 g. N-2-aminoethyl-N-ethyl-m-toluidine, 33.2 g. iminodiacetic acid, 0.1 g. sulfanilic acid were heated together at 180–190° C. for one hour. The reaction mixture was then poured into 300 ml. ethanol and the product allowed to crystallize. Collection by filtration gave 20.0 g. product when air dried. M.P. 191–194° C. One recrystallization from ethanol gave material melting at 197.5–198.5° C. The product had the following structure:

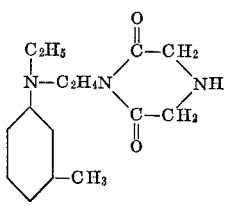

Preparation of 3-[2-(N-ethyl-m-toluidino)ethyl]5,6-dihydrouracil 19.7 gm. N-2-chloroethyl-N-ethyl-m-toluidine, 11.4 g. 5,6-dihydrouracil, 13.8 g. potassium carbonate, and 100 ml. dry dimethylformamide were refluxed together for one hour. The reaction mixture was drowned into water, and the product collected by filtration, washed with water, and recrystallized from 50% aqueous ethanol. Yield—20.5 g., M.P. 108–110° C. The product has the following structure:

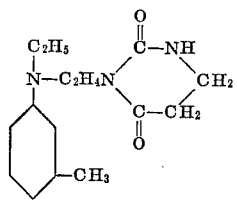

Preparation of 3-[2-(N-ethyl-m-toluidino)ethyl]2,4-thiazolidinedione 197 g. N-2-chloroethyl-N-ethyl-m-toluidine, 11.7 g. 2,4-thiazolidinedione, 13.8 g. potassium carbonate, and 100 ml. dry dimethylformamide were heated together at 130° C. for one hour. Drowning of the reaction mixture into water gave a yellow oil, which was washed by decantation and taken up in 100 ml. ethanol. The product crystallized when alcohol solution was chilled. There was obtained 10.0 g. of product after filtering and drying in air. M.P. 59–60° C.

All of the couplers used were prepared by one of the above methods.

EXAMPLES OF THE DYES

Example 1

0.76 g. NaNO$_2$ was added portionwise to 5 ml. conc. H$_2$SO$_4$. This solution was cooled in an ice bath and 10 ml. 1:5 acid was added, keeping the temperature below 20° C. This solution was cooled to 5° C. and 1.76 g. 2-amino-6-cyanobenzothiazole was added, followed by 10 ml. 1:5 acid. The mixture was stirred 2.5 hr. at ice-bath temperature. It was then added, with stirring to a chilled solution of 2.61 g. 3-[2-(N-ethyl-m-toluidino)ethyl]hydantoin in 25 ml. 1:5 acid. The coupling was neutralized to Congo Red with solid ammonium acetate and allowed to react at ice-bath temperature for 2 hr., at room temperature for one-half hour. It was then drowned with water, filtered, washed with water, and dried at room temperature. The product dyes cellulose acetate and polyester fibers a brilliant red shade.

The dye is:

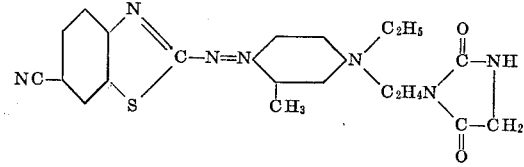

Example 1a 6.84 g. 2-amino-6-methylsulfonylbenzothiazole was suspended in 72 ml. water and 42.8 ml. conc. H$_2$SO$_4$ was added, with stirring. The amine dissolved. The solution was cooled to −5° C. and a solution of 2.52 g. NaNO$_2$ in 15 ml. conc. H$_2$SO$_4$ was added portionwise, keeping the temperature below 0° C. The diazotization was stirred 2 hr. at 0° C., then added, with stirring, to a solution of 8.28 g. of 4-[2-(N-ethyl-m-toluidino)ethyl]-3,5-morpholinedione in 100 ml. 15% aqueous H$_2$SO$_4$, all at about 5° C. The coupling was continued at this temperature for 2 hr., then drowned with water, filtered, washed with water, and dried. The product dyes cellulose acetate and polyester fibers red shades of excellent fastness. It has the structure:

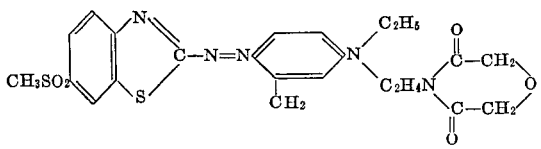

Example 1b 1.95 g. 2-amino-6-nitrobenzothiazole was suspended in 24 ml. water and 14 ml. conc. $H_2SO_4$ was added, with stirring. The amine dissolved. The solution was cooled to $-5°$ C. and a solution of 2.52 g. $NaNO_2$ in 15 ml. conc. $H_2SO_4$ was added portionwise, keeping the temperature below 0° C. The diazotization was stirred for 2 hr. at 0° C., then added, with stirring, to a solution of 2.78 g. of 3-[2-(N-ethyl-m-toluidino)ethyl]2,4-thiazolidinedione in 35 ml. 15% aqueous $H_2SO_4$, all at about 5° C. The coupling was continued at this temperature for about 2 hr., then drowned with water, filtered, washed with water, and dried. The product dyes cellulose acetate and polyester fibers violet. It has the structure:

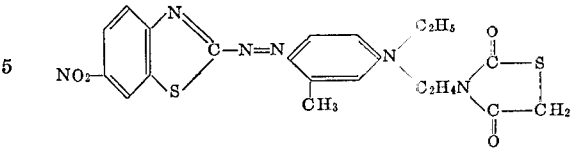

The azo compounds described in the following table, having Formula II below, and made in the same manner as described in Example 1 by diazotizing the indicated 2-aminobenzothiazole and coupling with the indicated coupling component

II

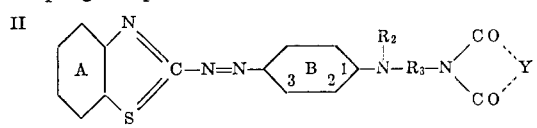

The color is that obtainable on polyester fibers.

| Example | Substituents of— | | $R_2$ | $R_3$ | Y | Color |
|---|---|---|---|---|---|---|
| | Ring A | Ring B | | | | |
| 2 | 6-CN | 3-$CH_3$ | —$C_2H_5$ | —$CH_2CH_2$— | —NHCH— (cyclohexyl) | Red. |
| 3 | 6-CN | 3-$CH_3$ | —$C_2H_5$ | —$CH_2CH_2$— | —$CH_2S$— | Red. |
| 4 | 6-CN | 3-$CH_3$ | —$C_2H_5$ | —$CH_2CH_2$— | —N($CH_3$)—$CH_2$— | Red. |
| 5 | 6-CN | None | —$C_2H_5$ | —$CH_2CH_2$— | —$CH_2SO_2CH_2$— | Red. |
| 6 | 6-CN | None | —$C_2H_5$ | —$CH_2CH_2$— | —$NHCH_2CH_2$— | Red. |
| 7 | 6-CN | None | —$C_2H_5$ | —$CH_2CH_2$— | —$CH_2OCH_2$— | Red. |
| 8 | 6-CN | None | —$C_2H_5$ | —$CH_2CH_2$— | —$CH_2SCH_2$— | Red. |
| 9 | 6-CN | None | —$C_2H_5$ | —$CH_2CH_2$— | —$CH_2NHCH_2$— | Red. |
| 10 | 6-CN | None | —$C_2H_5$ | —$CH_2CH_2$— | —$CH_2O$— | Red. |
| 11 | 6-$SO_2CH_3$ | 3-$CH_3$ | —$C_2H_5$ | —$CH_2CH_2$— | —CH=CH—NH— | Red. |
| 12 | 6-$SO_2CH_3$ | 3-$CH_3$ | —$C_2H_5$ | —$CH_2CH_2$— | —NHNH— | Red. |
| 13 | 6-$SO_2CH_3$ | 3-$CH_3$ | —$C_2H_5$ | —$CH_2CH_2$— | —C($CH_3$)($CH_3$)—N—$CH_2OH$ | Red. |
| 14 | 6-$SO_2CH_3$ | 3-$CH_3$ | —$C_2H_5$ | —$CH_2CH_2$— | —NH—(phenyl) | Red. |
| 15 | 6-$SO_2CH_3$ | 3-$CH_3$ | —$C_2H_5$ | —$CH_2CH_2$— | —O—(phenyl) | Red. |
| 16 | 6-$NO_2$ | 3-$CH_3$ | —$C_2H_4CN$ | —$CH_2CH_2$— | —NHCH($CH_3$)— | Violet. |
| 17 | 6-$NO_2$ | 3-Cl | —$C_2H_4CONH_2$ | —$CH_2CH(OH)$—$CH_2$— | —NHCHCH$_2$OH | Red. |
| 18 | 6-$NO_2$ | 3-$OCH_3$ | —$C_2H_4CONH_2$ | —$CH_2CH(OH)$—$CH_2$— | —NHCHC$_4$H$_9$ | Violet. |
| 19 | 6-$NO_2$ | 3-$NHCOCH_3$ | —$C_2H_4CN$ | —$CH_2CH_2CH_2$— | —NHCHCOOH | Red. |
| 20 | 6-$NO_2$ | 3-$CH_3$-6-$OCH_3$ | H | —$CH_2CH_2CH_2$— | —N(CH$_2$CH$_2$CH$_2$CH$_2$)—CH— | Violet. |
| 21 | 6-$SO_2NH_2$ | 2-$CH_3$ | H | —$CH_2CH_2CH_2$— | —$NHCH_2CH_2$— | Red. |
| 22 | 6-$SO_2NH_2$ | 2-Cl | H | —$CH_2CH_2CH_2$— | —$SCH_2$— | Red. |
| 23 | 6-$SO_2NH_2$ | 3-$CH_3$ | —$C_4H_9$ | —$CH_2CH_2$— | —$NHCH_2$— | Red. |
| 24 | 6-$SO_2CH_2CH_2OH$ | 3-$CH_3$ | —$C_4H_9$ | —$CH_2CH_2$— | —$SCH_2$— | Red. |
| 25 | 6-$SO_2CH_2CH_2OH$ | 3-$CH_3$ | —$C_2H_5$ | —$CH_2CH_2$— | —$SCH_2$— | Red. |
| 26 | 6-$SO_2C_4H_9$ | 3-$CH_3$ | —$C_2H_5$ | —$CH_2CH_2$— | —$SCH_2$— | Red. |
| 27 | 6-$SO_2C_4H_9$ | 3-$CH_3$ | Cyclohexyl | —$CH_2CH_2$— | —$SCH_2$— | Red. |
| 28 | 6-$SO_2C_2H_4CN$ | 3-$CH_3$ | —$C_2H_4OCH_3$ | —$CH_2CH_2$— | —$SCH_2$— | Red. |

| Example | Substituents of— Ring A | Substituents of— Ring B | $R_2$ | $R_3$ | Y | Color |
|---|---|---|---|---|---|---|
| 29 | 6-$SO_2C_2H_4CN$ | 3-$CH_3$ | —$C_2H_4OCOCH_3$ | —$CH_2CH_2$— | —$SCH_2$— | Red. |
| 30 | 6-$SO_2N(CH_3)_2$ | 3-$CH_3$ | —$C_2H_4SO_2CH_3$ | —$CH_2CH_2$— | —$SCH_2$— | Red. |
| 31 | 6-$CH_3$ | 3-$CH_3$ | —$CH_2CH(CH_3)$—$CH_3$ | —$CH_2CH_2$— | —NHNH— | Red. |
| 32 | 6-$CH_3$ | 3-Cl | —$CH_2CH(CH_3)$—$CH_3$ | —$CH_2CH_2$— | —NHNH— | Scarlet. |
| 33 | None | 3-Br | —$CH_2CH(CH_3)$—$CH_3$ | —$CH_2CH_2$— | —NHNH— | Scarlet. |
| 34 | None | 3-Br | —$CH_2CHOHCH_2Cl$ | —$CH_2CH_2$— | —$CH_2O$—$CH_2$— | Scarlet. |
| 35 | 6-$OCH_3$ | 3-$CH_3$ | —$C_2H_4N(CO)_2R_2$ | —$CH_2CH_2$— | —$CH_2O$—$CH_2$— | Red. |
| 36 | 6-$OCH_3$ | 3-Cl | —$C_2H_4N(CO)_2R_2$ | —$CH_2CH_2$— | —$CH_2O$—$CH_2$— | Scarlet. |
| 37 | 6-$SCH_3$ | 3-$CH_3$ | —$CH_2CH_2OH$ | —$CH_2CH_2$— | —NHNH— | Red. |
| 38 | 6-$SO_2C_2H_4CN$ | 3-$CH_3$ | —$CH_2CH_2OH$ | —$CH_2CH_2$— | —$CH_2SCH_2$— | Pink. |
| 39 | 4,6-di-Cl | 3-$CH_3$ | —$C_2H_4Cl$ | —$CH_2CH_2$— | —$CH_2SCH_2$— | Red. |
| 40 | 4,6-di-$CH_3$ | 3-$CH_3$ | —$C_2H_4Cl$ | —$CH_2CH_2$— | —$CH_2SCH_2$— | Red. |
| 41 | 6-$SCH_2CH_2CN$ | 3-$CH_3$ | —$C_2H_4OCONHC_6H_5$ | —$CH_2CH_2$— | —$CH_2SCH_2$— | Red. |
| 42 | 6-SCN | 3-$CH_3$ | —$C_2H_4CO_2C_2H_5$ | —$CH_2CH_2$— | —$CH_2SCH_2$— | Red. |
| 43 | 6-$NHCOCH_3$ | 3-$CH_3$ | —$CH_2CH(CH_3)CN$ | —$CH_2CH_2$— | —$CH_2SCH_2$— | Red. |
| 44 | 4-$CH_3$-6-$NO_2$ | 3-$CH_3$ | —$CH_2CH(CH_3)CN$ | —$CH_2CH_2$— | —$CH_2SCH_2$— | Violet. |
| 45 | 6-CN | 3-$CH_3$ | —$C_2H_5$ | —$CH_2CH_2$— | —$CH_2OCH_2$ | Red. |
| 46 | 6-$SO_2CH_3$ | 3-$CH_3$ | —$C_2H_5$ | —$CH_2CH_2$— | —$CH_2OCH_2$ | Red. |
| 47 | 6-$SO_2CH_3$ | 3-$CH_3$ | —$C_2H_5$ | —$CH_2CH_2$— | —NH—$C(CH_3)_2$ | Red. |
| 48 | 6-$NO_2$ | 3-$CH_3$ | —$C_2H_5$ | —$CH_2CH_2$— | —$CH_2S$— | Violet. |

Although the invention has been described in considerable detail with particular reference to certain preferred embodiments thereof, it will be understood that variations and modifications can be effected within the spirit and scope of the invention as described hereinabove, and as defined in the appended claims.

What we claim is:

1. A water-insoluble azo compound having the formula

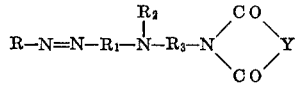

wherein
$R$ is a 2-benzothiazolyl radical;
$R_1$ is p-phenylene or p-phenylene substituted with lower alkyl, lower alkoxy, halogen, lower alkanoylamino, benzamido, lower alkylthio, or lower alkylsulfonamido;
$R_2$ is hydrogen; lower alkyl; lower alkyl substituted with hydroxy, halogen, lower alkoxy, cyano, lower alkanoyloxy, lower carboalkoxy, lower alkylsulfonyl, lower alkyl —OCOO—, carbamoyl, lower alkylcarbamoyl, phenoxy, or lower alkylsulfonamido; benzyl; phenyl, or phenyl substituted with lower alkyl, lower alkoxy, or halogen;
$R_3$ is lower alkylene or 2-hydroxypropylene; and
Y is —$CH_2NHCH_2$—, —$NHCH_2$—, —$CH_2OCH_2$—, —$SCH_2$—, —$NHCHC_6H_5$, $CH_3N$—$CH_2$—
—$CH_2SO_2CH_2$—, —$NHCH_2CH_2$—, —$CH_2O$—
—CH=CHNH—, —NHNH—
—$C(CH_3)_2N$—$CH_2OH$, —$NHCHCH_3$, —$NHCHCH_2OH$, —$NHCHC_4H_9$
—$CH_2SCH_2$—
—$NHC(CH_3)_2$

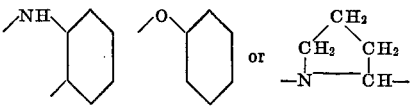

2. A compound according to claim 1 wherein $R_2$ is lower alkyl; and Y is —$NHCH_2CH_2$.

3. A compound according to claim 1 wherein
$R_2$ is lower alkyl; and
Y is —NHCH$_2$—.

4. A compound according to claim 1 wherein
$R_2$ is lower alkyl; and
Y is —CH$_2$NHCH$_2$—.

5. A compound according to claim 1 wherein
$R_2$ is lower alkyl; and
Y is —CH$_2$OC$_2$—.

6. A compound according to claim 1 wherein
$R_2$ is lower alkyl; and
Y is —CH$_2$S—.

7. The compound

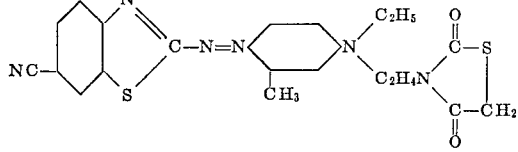

8. The compound

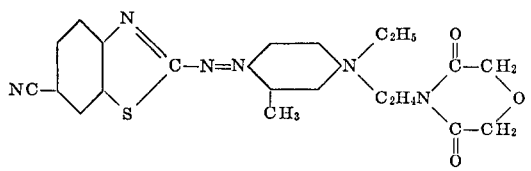

9. The compound

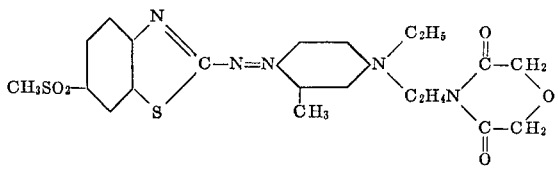

10. The compound

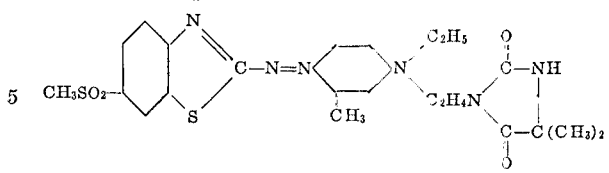

11. The compound

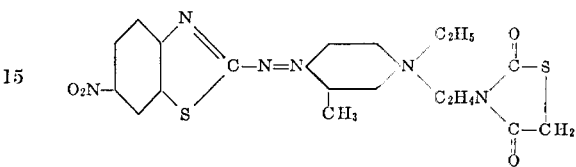

References Cited

UNITED STATES PATENTS 3,161,631   12/1964   Straley et al. _____ 260—158

CHARLES B. PARKER, *Primary Examiner.*

DONALD M. PAPUGA, *Assistant Examiner.*

U.S. Cl. X.R.

8—41, 55; 260—37, 247, 256.4, 268, 305, 309.5